Figure 1:
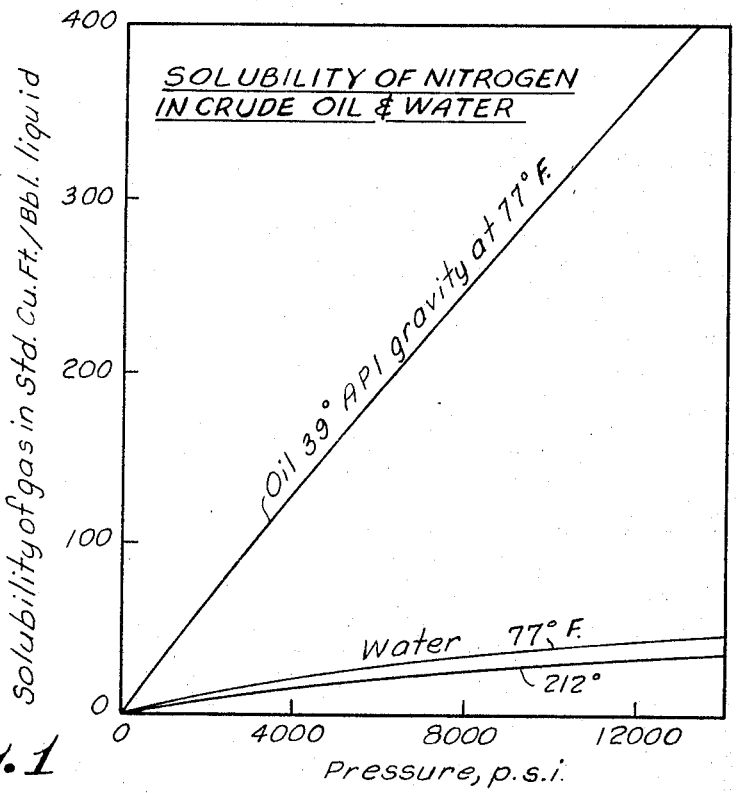

3,323,593
METHOD OF TREATING AN OIL-BEARING FORMATION
William C. Foshee and Charles L. Wendorff, Tulsa, Okla., assignors to The Dow Chemical Company, Midland, Mich., a corporation of Delaware
Filed Mar. 16, 1964, Ser. No. 351,909
15 Claims. (Cl. 166—42)

The invention relates to an improved method of treating a fluid-bearing subterranean formation.

The term "treating a formation," as used herein, refers to any operation wherein a fluid-bearing formation is contacted with a fluid (either liquid or gas) introduced into the formation. It includes drilling wells and stimulating wells to increase the rate or quantity of production therefrom. In all operations involving the treatment of a formation, a problem exists due to the tendency of fluids so employed to leak away or seep into a formation to an extent and in areas where such leakage or seepage lessens or prevents the attainment of the objectives of the treatment. As illustrative of such condition, a drilling fluid, in order to attain the purposes for which it is used, viz., cooling the drilling bit, carrying the cuttings from the bit and upwardly in the borehole, plastering the face of the borehole to lessen sloughing thereof, and providing hydrostatic pressure in the borehole, must remain substantially in the borehole except when conveyed as desired to a setting sump on the surface. Accordingly, any appreciable loss of drilling fluid in the formation is sought to be avoided. Also, in attempts to stimulate flow of water, gas, or oil from a formation by such techniques as fracturing or acidizing, it is desired that the treating fluid be controlled so that it fractures or acidizes where such effects are desired and does not escape into porous portions of the formation where such effects are not being sought.

Although substantial progress has been made in lessening the loss of fluids in the formation in drilling and stimulation operations, loss of an objectionable extent still exists in a great many such operations. One expedient which has proved helpful is the addition to the treating fluid of a substance which directly, or by subsequent reaction or modification in the borehole, bridges or otherwise plugs off pores and larger cracks into which it is not intended that the treating fluid go. A disadvantage, however, usually accompanies the use of commonly employed fluid loss control agents, viz, the accumulation of a sort of filter cake over and in the pores of a porous rock, which to some extent is deleterious and tends to cause a certain amount of blockage of the flow of fluid from the formation when the well is put back into production.

A need is apparent for a method of treating wells including drilling and stimulation operations where the fluid loss of the fluid being used, to the formation, is inhibited without the accompanying undesirable effect of impeding the out-flow of formation fluid when the well is subsequently put into production. There is also a need for a method which reduces the quantity of liquids needed for the drilling or stimulation operation.

The invention meets this and related needs by providing a method of drilling or stimulating production from a formation traversed by a wellbore wherein a low fluid loss composition is employed which does not contain any materials which tend subsequently to plug or block in any way the normal flow in a formation. Moreover, the method of the invention provides a highly effective method of carrying out a large number of treating operations including fracturing, wherein there is an economically low fluid loss of treating fluid to the formation.

The invention is a method of treating a formation penetrated by a wellbore employing a treating liquid wherein fluid loss to the formation is inhibited, which comprises:
(A) admixing
(1) a principal oil-base or aqueous-base liquid;
(2) a surface active agent, hereinafter usually called surfactant, in an amount of between about 0.01 percent and about 20 percent by volume, based upon the volume of said oil-base or aqueous-base liquid, and which may be anionic, cationic, nonionic, or mixture thereof;
(3) a relatively small amount of a conditioning liquid which is substantially immiscible with said principal liquid;
(4) a gas which is not objectionably chemically reactive with either of the substantially immiscible liquids or surfactant present, in an amount in excess of that which will dissolve at the temperature and pressure of the formation where the treatment is to be carried out; and
(B) forcing the resulting composition into contact with the formation at the level at which treatment thereof is to be carried out.

Illustrative of gases which are not objectionably chemically reactive with liquid components of the composition and suitable for the practice of the invention are argon, helium, krypton, xenon, nitrogen, carbon dioxide, and low boiling hydrocarbon, e.g., propane, ethane, methane, and mixtures thereof. It is to be understood that the gas employed may be admixed with the liquid portion of the fluid either above ground as in a tank or by feeding into a common line leading to the well or in the tubing in the wellbore, or at the bottom of the well prior to entrance of an appreciable portion of the fluid into the formation. Accordingly, either some or all of the components may be injected individually into the wellbore for subsequent mixing or they may be pre-mixed or mixed during injection.

The principal liquid employed may be any liquid acceptable for drilling or improving production from a well including clear-type or low-solids and mud-type drilling fluids, fracturing liquids, acidizing liquids, water shut-off liquid compositions, demulsifiers, and liquids used for working or reworking a well. The oil or aqueous liquid employed may be gelled or thickened if desired.

When an oil-base principal liquid is employed, the recommended surface active agent (to which reference is commonly made as surfactant) is the tetraalkyl ammonium halide cationic-type. The following generic formula represents such type of surfactant:

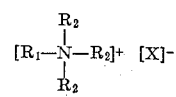

wherein $R_1$ and $R_2$ represent the same or different alkyl groups of from 1 to about 18 carbon atoms each and X is a halide.

A preferred surfactant of this type is one wherein $R_1$ represents alkyl groups containing from 1 to about 3 carbon atoms, e.g. methyl, $R_2$ represents alkyl groups containing from about 6 to about 20 carbon atoms, and X is chloride.

Illustrative of a type of surfactant to employ is dimethyl-dicoco ammonium chloride. This surfactant is especially effective in compositions employed in the practice of the invention wherein the principal liquid is of the oil-base type. The dicoco substituent is that which results from the amidation of saponified coconut oil. A typical saponified coconut oil is considered to have an approximate composition, as follows in percent by weight:

| | Percent |
|---|---|
| Caprylic acid | 8.0 |
| Capric acid | 7.0 |
| Lauric acid | 48.0 |
| Myristic acid | 17.5 |
| Palmitic acid | 8.2 |
| Stearic acid | 2.0 |
| Oleic acid | 6.0 |
| Linoleic acid | 2.5 |
| Unsaponified | 0.8 |
| | 100.0 |

Particularly good surfactants to employ when an aqueous-base liquid is the principal liquid of the composition are the adduct formed by reacting about 10 moles of ethylene oxide per mole of di-secondary-butylphenol and the ethoxylated diamines.

The substantially immiscible conditioning liquid to employ in the practice of the invention, when an oil is the basic liquid used, may be water or any aqueous solution including acids, brines, and especially prepared aqueous liquids commonly employed in well treatments to attain specific objectives. Contrariwise, when the basic liquid employed is water, brine, or the like, the immiscible conditioning liquid may be crude oil, or fractionated, cracked, or residuum product of crude oil, or any oil material economically feasible to employ, e.g., carbon tetrachloride, carbon disulfide, or certain vegetable oils and fatty acids, aliphatic ketones and aldehydes and the like in which the carbon chain length is sufficiently long for the compound to be substantially water-immiscible. The amount of the immiscible conditioning liquid, whether of oil or aqueous mixture to employ, as above indicated, is usually relatively small. A satisfactory amount to employ may be as little as about 0.01% based upon the volume of the basic liquid. Up to about 10% of the immiscible conditioning liquid may be employed. The amount of the immiscible conditioning liquid commonly employed in the practice of the invention is between about 0.4% and about 2.5% by volume.

The following mathematical expression may conveniently be used to ascertain the minimum volume of substantially inert gas, at standard pressures and temperature, that is necessary to employ in the invention:

$$G = \frac{P_2 V_2 / P_1 + L(s)}{L}$$

wherein $G$=total gas in standard cubic feet per cubic foot of liquid;

$P_2$=pressure at the level of treatment in pounds per square inch;

$V_2$=volume of gas at the pressure existing at the level of treatment (maintained constant at 1 cubic foot);

$P_1$=atmospheric pressure in pounds per square inch;

$L$=desired amount of liquid in cubic feet per cubic foot of gas at the level of treatment;

$s$=solubility of the gas employed in standard cubic feet per cubic foot of liquid employed.

Figure 2:
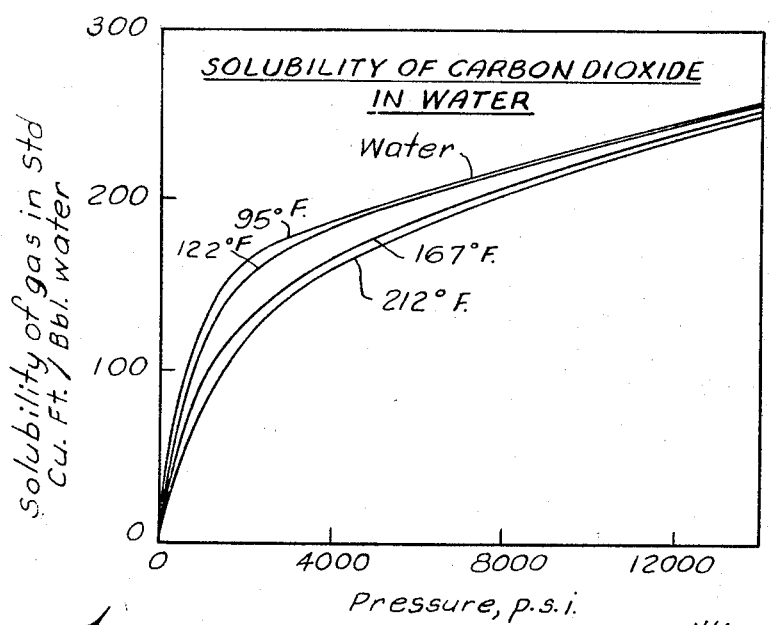

Since either water or crude oil is commonly employed as the basic fluids for use in a number of treating operations, and since nitrogen or carbon dioxide is commonly used as the gas in the invention, graphs are shown in FIGURES 1 and 2 in the drawing wherein FIGURE 1 shows the solubility of nitrogen at increasing pressures, at 77° F. in water and in a crude oil of 39° API gravity and FIGURE 2 shows the solubility of carbon dioxide at increasing pressures in water at 95° F., 122° F., 167° F., and 212° F. From a chart of this nature, the $s$ value for the expression above may be obtained by converting the nitrogen value given in cubic feet per 42-gallon barrel to that of cubic feet of nitrogen per cubic foot of oil or water by dividing the number of cubic feet of nitrogen, soluble per barrel, by 5.61, since a 42-gallon barrel contains about 5.61 cubic feet.

Solubility values of inert gases in various liquids at various temperatures may be obtained by consulting standard references, e.g., International Critical Tables, vol. III (1928), McGraw-Hill Publishing Company. The solubility of nitrogen gas in water, brine, and organic solvents, is set out in Solubilities of Inorganic and Metal Organic Compounds, vol. I, 3rd ed., pages 1017 to 1027, by Seidell (1940), Van Nostrand Publishing Company, and International Critical Tables, vol. III, page 17 (1928), McGraw-Hill Publishing Company.

In the practice of the invention, the base treating liquid, immiscible conditioning liquid, and surfactant, with or without other agents, e.g., an acid or demulsifier, are usually first intermixed. According to one embodiment of the invention, the gas employed may be introduced into the liquid mixture so made, either as the gaseous state, or as readily gasifiable liquid. When nitrogen or carbon dioxide is employed in the practice of the invention, it may be admitted into the line through which the treating liquid is passed, at a point near to or at the well head, as a liquid. In either instance, they are converted instantaneously or very shortly thereafter into the desired gaseous form. The rate of introduction of such low boiling liquid, as a liquid, must not be sufficiently great to result in complete congealment or freezing. The gas component may already be in gaseous form under relatively high pressure before being introduced into the treating liquid.

Although the invention is not to be construed as being dependent on a theory of its performance, it appears to attain the objective of reduced fluid loss during drilling and production stimulating operations as a result of a complexity of interrelationships of the surfactant, gas, and the contrasting properties of the immiscible liquids and the effects of these materials in combination on blocking the flow of the resulting composition into a porous formation. At least in part, the efficacy of the method of the invention may be due to the drop in pressure which occurs as the gas-liquid composition moves through the porous formation which allows a portion of the gas to come out of solution. It is probable that the beneficial results are further enhanced as a result of a modification of the wettability characteristics of the formation and of the interfacial tension among the formation surface, the gas, and the liquids present.

The following tests were made to show the effect of the surfactant and small amount of conditioning immiscible liquid on an aqueous or oil-base liquid, on fluid loss through a core of sandstone typical of that found in oil-producing formations. The cores were 2 inches in diameter, 3.5 inches long, and had a 0.5 inch opening drilled axially through the center which was sealed off at each end face so that fluid accessibility to the opening would have to be through sandstone by passing into the circumferential surface and advancing into the axial center opening. The axial opening was connected by a tube to a graduated receiving means for the purpose of measuring the quantity of fluid, being tested, which passed radially through the cover and out the axial opening. The circumferential surface of each core was about 144 square centimeters which is about six times the area of the filtration area provided in the Baroid High Pressure Tester, specified for use in API RP 39. The cores thus prepared were centrally positioned in a cylindrical chamber forming part of a circulation system for liquids comprising an especially prepared testing apparatus. The cylindrical chamber was 2.5 inches in diameter which provided a clearance between the circumferential surface of the core and the inside surface of the chamber of 0.25 inch. The core, with its end surfaces sealed off, was maintained substantially centrally positioned in the chamber to provide a more-or-less uniform space between the core's circumferential surface and the inner surface of the chamber. The chamber, thus forming part of a closed circulating system, provided a substantially uniform flow of liquid into one end of the chamber, thereby providing flow past the exterior of the core through the space between the core and the inner surface of the chamber. The purpose of the space provided between the core and the inner surface of the chamber was to simulate a fracture in a subterranean formation which was accessible to an incoming treating fluid. The purpose of the axial opening and graduated receiver connected thereto, as aforesaid, was to provide an exit from the core for fluid being tested which has passed radially from the circumferential surface to the center of the core. Variations in the rate that liquid collected in the receiver employing different compositions was a measure of the fluid loss properties of each composition. The fluids employed in the test were injected into the testing chamber at a controlled and recorded pressure.

A series of tests was run employing the abovedescribed testing apparatus or its equivalent to evaluate fluid loss properties, through sandstone cores, of treating fluids which were varied in order to show the fluid loss properties of such fluid when it did and when it did not contain one or more of: nitrogen gas, a surfactant, and a small amount of an immiscible conditioning liquid, all of which are required by the invention, in contrast to the properties of treating fluids of a conventional type. Although sandstone cores were employed in the examples, it is understood that the case of such cores was for illustrative purposes only and that the invention is similarly applicable to limestone or other formation rock having porous characteristics.

Series 1

This series of tests was run to show the effect of the presence of an inert gas on the fluid loss of both an aqueous and oil treating liquid. It was carried out by employing nitrogen gas in an amount in excess of that necessary to saturate the treating fluid designated in Table I. The flow rate was taken as that amount of the treating fluid which was forced through the circumferential surface inwardly to the axial opening and thence to the graduated receiver during a specific time. Readings were taken in milliliters per minute per square centimeter of exposed surface. The percent drop in flow rate of the liquid was based on decrease in the ratio of the rate of flow through the core in the presence of nitrogen gas to the rate of flow when no nitrogen gas was present. Permeabilities are given in millidarcies (md.) according to Darcy's well known principles and formulae wherein the pressure differential between the circumferential surfaces and the axial center hole in the examples was 1000 pounds per square inch. For an informative discussion of Darcy's principles and formulae, it is suggested that reference be made to standard treatises on the subject, e.g. Physical Principles of Oil Production, by Morris Muskat, published by McGraw-Hill, New York, N.Y.

TABLE I

| Test No. | Core permeability in md. | Treating fluid | Flow rate [1] without $N_2$ | Flow rate with $N_2$ | Percent reduction in flow rate |
|---|---|---|---|---|---|
| 1 | 0.9 | $H_2O$ | 1.4 | 0.9 | 35 |
| 2 | 2.2 | $H_2O$ | 3.2 | 1.6 | 50 |
| 3 | 20.0 | $H_2O$ | 31.4 | 4.5 | 85 |
| 4 | 3.2 | Kerosene | 2.9 | 1.4 | 52 |
| 5 | 27.0 | ---do--- | 19.0 | 2.8 | 85 |

[1] All flow rates are given in milliliters per minute per square centimeter of circumferential surface area of the cores.

Reference to Table I shows that there is a definite reduction in flow rate, i.e. rate of loss radially through the core, when free gas is present in either water or kerosene. It also shows that the more permeable the core, the more effective, as a fluid loss preventive, is the substantially inert gas in the treating fluid.

Series 2

This series of tests was run to show the effect of the presence of a surface active agent but in the absence of an inert gas in both an aqueous and an oil treating liquid. Cores of the type described above were positioned in the chamber of the testing apparatus described above. In carrying out this series of tests, kerosene alone was first employed as the treating fluid and then kerosene containing the surfactant dimethyl-dicoco-ammonium chloride, and the results compared. Alternately, water alone was employed as the treating fluid and then water containing an adduct prepared by reacting about 10 moles of ethylene oxide per mole of a tallow amine, and the results compared.

TABLE II

| Test No. | Test pressure | Core permeability in md. | Treating fluid | Flow rate [1] without surfactant | Flow rate with 0.2% surfactant | Percent reduction in flow rate [2] |
|---|---|---|---|---|---|---|
| 6 | 500 | 3.5 | Kerosene | 1.20 | 0.58 | 52 |
| 7 | 1,000 | 10.2 | Water | 17.8 | 15.7 | 11 |

[1] Flow rate is given in milliliters per minute per square centimeter of circumferentia core surface.
[2] Percent reduction values are based on volume ratio. They are found by (a) subtracting the improved flow rate (i.e. that of the fluid containing the additive) from the unimproved flow rate (i.e. that of the fluid not containing the additive), (b) dividing the difference so found by the unimproved flow rate, and (c) converting the value there found to percent by multiplying by 100.

Reference to Table II shows that there is some reduction in flow rate, i.e. rate of fluid loss, through the core, when a surfactant is admixed with the treating fluid. However, upon comparison to the vastly improved results obtained when all components of the treating composition are present as required by the invention, as subsequently shown, e.g. Run 18 of Table IV and Run 24 of Table V.

Series 3

This series of tests was made to show the fluid loss characteristics of conventional treating fluids containing some of the more widely used commercially successful fluid-loss control agents. The conventional fluid-loss agent used in this series of tests for water consisted of guar gum plus finely subdivided silica, commonly known as silica flour. In oil-base fluids the conventional fluid loss additive used in these tests consisted of the fluid loss additive described in Brown and Sanders U.S. Patent No. 2,779,735, e.g., claim 1 thereof, referred to herein as "A." The percent reduction in flow rate resulting from additions of the agents are set out in Table III.

TABLE III

| Test No. | Test pressure | Core permeability in md. | Test liquid [1] | Flow rate [2] without additive | Flow rate [2] with additive | Percent reduction in flow rate |
|---|---|---|---|---|---|---|
| 8 | 1,000 | 2.6 | Water with x and y | 4.6 | 0.04 | 99.1 |
| 9 | 1,000 | 9.0 | do | 15.8 | 0.04 | 99.7 |
| 10 | 2,000 | 1.5 | do | 5.3 | 0.05 | 99.0 |
| 11 | 1,000 | 12.7 | Water with xx and y | 22.2 | 0.01 | 99.1 |
| 12 | 1,000 | 1.8 | Kerosene with z | 1.3 | 0.01 | 99.2 |
| 13 | 1,000 | 5.0 | Crude oil with zz | 4.6 | 0.03 | 99.3 |

[1] x means 10 pounds of guar gum and y means 16 pounds of silica flour per 1,000 gallons of water. xx means 20 pounds of guar gum per 1,000 gallons of water. z means 25 pounds of "A" per 1,000 gallons of liquid. zz means 50 pounds of "A" per 1,000 gallons of liquid.
[2] Flow rates are in cc. per minute per sq. cm. of circumferential core surface.

Reference to Table III shows that a reduction in rate of flow is attained by the use of (1) the guar gum and the silica flour in water or (2) "A" in an oil-base liquid, according to conventional practices wherein commercially proved fluid loss agents are employed. The reliability of the test procedure is thus shown. However, when such fluid loss agents are used the agent remains in the formation and, unlike the instant invention, may impede free fluid flow.

*Series 4*

This series of tests was run to show the effect of the presence of water as the immiscible conditioning liquid and of an inert gas in an oil-base treating liquid, and of certain combinations of components of the invention in the absence of others, and finally such effect when all ingredients are present according to the invention.

Reference to Table IV shows that despite the reduction in flow rate (fluid loss) brought about by the presence of one or combinations of the components necessary to the practice of the invention, the reduction in flow rate was definitely more pronounced when all components were present.

*Series 5*

This series of tests was similar to that of Series 4 except that the basic treating fluid was water and the small amount of immiscible conditioning fluid was kerosene. The results are shown in Table V.

TABLE IV

| Test No. | Flow rate in ml./min./sq. cm. at test pressure of 1,000 p.s.i. | | | | | | Percent reduction in flow rate |
|---|---|---|---|---|---|---|---|
| | Kerosene only | Kerosene plus 1% water [1] | Kerosene plus 20% $N_2$ | Kerosene plus 1% water plus 20% $N_2$ | Kerosene plus .5% surfactant | Kerosene plus 0.5% surfactant [2] plus 20% $N_2$ plus 1% water | |
| 14 | 17 | 3.9 | | | | | 77.0 |
| 15 | 2.9 | | 1.4 | | | | 51.7 |
| 16 | 5.9 | | | 3.7 | | | 37.3 |
| 17 | 3.2 | | | | 0.04 | | 98.8 |
| 18 | 12.0 | | | | | 0.02 | 99.9 |

[1] All percents are by volume. [2] Surfactant was dimethyl-dicoco-ammonium chloride.

TABLE V

| Test No. | Flow rate in ml./min./sq. cm. at 1,000 p.s.i. | | | | | | | Percent reduction in flow |
|---|---|---|---|---|---|---|---|---|
| | Water only | Water plus 10% $N_2$ [1] | Water plus 1% kerosene | Water plus 0.2% surfactant [2] plus 1% kerosene | Water plus 1% kerosene plus 10% $N_2$ | Water plus 10% $N_2$ plus 0.2% surfactant | Water plus 10% $N_2$ plus 1% kerosene plus 0.2% surfactant | |
| 19 | 31.4 | 4.5 | | | | | | 85.6 |
| 20 | 24.1 | | 1.1 | | | | | 95.5 |
| 21 | 5.7 | | | 0.9 | | | | 84.2 |
| 22 | 10.9 | | | | 0.6 | | | 94.5 |
| 23 | 5.9 | | | | | 0.22 | | 96.1 |
| 24 | 16.3 | | | | | | 0.07 | 99.7 |

[1] All percents are by volume. [2] Surfactant is ethoxylated tallow amine.

TABLE VI

| Test No. | Flow rate of water alone | Percent by Volume of Additive to Water | | | | Flow rate of water plus additives | Percent reduction of flow rate |
|---|---|---|---|---|---|---|---|
| | | Kerosene | $N_2$ | Surfactant [1] | Amount used | | |
| 25 | 12.6 | 1.0 | 10.0 | Nonionic A | 0.2 | 0.06 | 99.5 |
| 26 | 8.9 | 1.0 | 10.0 | Nonionic B | 0.2 | 0.10 | 98.9 |
| 27 | 9.3 | 0.8 | 10.0 | Nonionic C | 0.2 | 0.18 | 98.1 |
| 28 | 5.6 | 1.0 | 10.0 | Anionic D | 0.2 | 0.14 | 97.4 |
| 29 | 24.7 | 1.0 | 10.0 | Anionic E | 0.5 | 0.12 | 99.5 |
| 30 | 5.4 | 0.8 | 10.0 | Cationic F | 0.2 | 0.03 | 99.5 |
| 31 | 16.3 | 1.0 | 10.0 | Cationic G | 0.2 | 0.07 | 99.6 |
| 32 | 5.4 | 1.0 | 10.0 | Silicone H | 0.2 | 0.18 | 96.0 |

[1] The alphabetical designations are:
  A. Di-sec-butylphenol condensed with 10 moles of ethylene oxide.
  B. Diethanol amide of coconut oil.
  C. An ethoxylated coco amide.
  D. Sulfonated diphenyl oxide.
  E. Sodium lignosulfonate.
  F. An ethoxylated coco amine.
  G. An ethoxylated tallow diamine.
  H. A silicone.

The tests show that fluid loss into formation rock, as illustrated by sandstone, according to the practice of the invention, is reduced to a much greater extent than would be expected through a knowledge of the properties of the individual materials used. There is clearly a synergistic effect produced by the required materials in combination.

Reference to Tables IV and V show that the presence of all the required components of the fluid employed in an embodiment of the practice of the invention, viz., either a water-base or an oil-base treating fluid, a surfactant, nitrogen gas in sufficient amount to form separate gas and liquid phases, and a small amount of a conditioning liquid immiscible with the base treating fluid reduces, the flow rate to an extent not anticipated by any one of these materials singly or by any combination of less than all.

*Series 6*

These tests were run to show the effect of employing various types of surfactants, including cationic, nonionic, and anionic, in the practice of the invention wherein the treating liquid comprised water containing a small amount of kerosene, as shown, 10% by volume nitrogen gas and the percent of the surfactant shown. Table VI sets out the results of thus varying the type surfactant used, expressed in milliliters per minute per square centimeter of core filter surface, at 1000 p.s.i. test pressure.

*Series 7*

This series of runs was made to show the effect of fluid loss employing different surfactants in a well treating liquid comprising kerosene containing 1% water, 10% nitrogen gas, and 0.5% of the surfactant, by volume in accordance with the practice of the invention. The results are shown in Table VII in milliliters per minute per square centimeter at circumferential core area, at 1000 p.s.i.

TABLE VII

Effect of varying surfactant on fluid loss rate.
Tests performed at 1,000 p.s.i.
Base fluid, Kerosene
Flow rate, cc./min./sq. cm.
Additives, 1% water plus 10% $N_2$ plus 0.5% surfactant.

| Test No. | Flow rate of kerosene | Surfactant type | Flow rate of kerosene plus additive | Percent reduction in flow rate |
|---|---|---|---|---|
| 33 | 12.0 | Cationic K | 0.02 | 99.8 |
| 34 | 7.3 | Cationic L | 0.12 | 98.4 |
| 35 | 4.0 | Cationic M | 0.15 | 96.4 |
| 36 | 17.1 | Anionic N | 0.096 | 99.4 |
| 37 | 13.3 | Nonionic O | 0.21 | 98.4 |
| 38 | 9.3 | Cationic P | 0.32 | 96.6 |

In the above table, the alphabetical designations are as follows:
K—Dimethyl-dicoco ammonium chloride.
L—Ethoxylated quaternary ammonium chloride.
M—Diamine from coconut oil.
N—Dowfax 6A2.
O—Diethanol amide of coconut oil.
P—Mixture of a cationic amine surfactant plus a nonionic surfactant.

Reference to Tables VI and VII shows that any of a number of surfactants may be employed to attain the reduction in fluid loss according to the invention, when employed with a preponderance of either an aqueous base or an oil base liquid containing a small but significant amount of a conditioning immiscible liquid and sufficient inert gas in excess of saturation to provide free gas in the treating liquid.

Although nitrogen gas was used in the above examples, it is understood that any gas which is substantially unreactive with the liquid components of the treating composition may be used. For example, carbon dioxide, as shown in FIGURE 2 of the attached drawing is excellent for use in aqueous fluids, its rather high solubility in oil being somewhat of a disadvantage for use in oil.

*Field example*

The following example illustrates the practice of the invention in a field operation. An oil well in a production field of Texas which extended into a producing zone, at a level between 8345 and 8376 feet, was to be treated. There were 9 perforations in the casing at the producing zone level.

The well was equipped with a 5½-inch casing and a 2-inch tubing. A treating fluid was prepared which consisted of the following materials: (a) 40,000 gallons of crude oil, obtained in the field, thickened by 1.5 parts by volume of a fatty acid soap prepared by reacting a mixture of tall oil and aliphatic organic acids containing from about 6 to about 10 carbon atoms per molecule with an alkali metal hydroxide in an amount sufficient to neutralize the acids, (b) 40,000 pounds of 20 to 40 mesh sand, (c) 250 standard cubic feet of nitrogen gas per barrel of the crude oil, (d) 0.1 percent, by weight of the crude oil, of dimethyl-dicoco-ammonium chloride, and (2) 0.5 percent water based on the volume of the crude oil. The water was not added as a separate component but was the amount calculated to be present in the composition as a result of the water portion of the soap added.

The composition so prepared was injected, according to the practice of the invention, down the well at sufficient pressure to create fractures in the formation. Based upon the history of production of the well, the potential production from this well, following a fracturing treatment was estimated to be 220 barrels of oil per day.

For comparative purposes, an off-set well, penetrating the same formation with perforations at the same level, was treated with 20,000 gallons of the same composition as that employed in the example, except that no nitrogen gas nor surfactant was employed. Based upon the history of production of the well, the potential production of the off-set well following treatment was estimated to be 180 barrels of oil per day. However, following the treatment of the off-set well (which was not in accordance with the invention) the tubing pressure was only one-half that of the well treated according to the invention, indicating that the fractures created by treatment of the off-set well were only about half as extensive or effective, or in other words, the formation was only opened up, in the case of the off-set well, to about one-half the extent, as evidenced by the lower formation pressure at the wellbore.

As further advantages of the well treated according to the invention was the ease with which the treating composition was removed from the formation and well (as aided by the gas present) and the absence of residual plugging agent which might tend to impede fluid flow in the formation after treatment.

Having described our invention what we claim and desire to protect by Letters Patent is:

1. In a method of treating a formation penetrated by a wellbore employing a fluid composition, comprising a principal liquid selected from the class consisting of oil-base and aqueous-base liquids, which is injected down the wellbore and brought into contact with the formation, the improvement which comprises (A) admixing with said principal liquid (1) an amount of between about 0.01 and about 10.0 percent, based on the volume of said principal liquid, of a conditioning liquid immiscible with said principal liquid and selected from the class consisting of an aqueous liquid when said principal liquid is an oil-base liquid and of an oil when said principal liquid, is an aqueous-base liquid, (2) between about 0.01 and about 20 perecnt, based on the volume of said principal liquid of a surface active agent, and (3) a gas, which is not objectionably reactive with the liquids present, in an amount in excess of that which will dissolve in the liquid composition at the temperature and pressure existing at the levels of the formation being treated to make an improved low fluid loss composition, and (B) forcing the improved composition so made into contact with the formation at the levels being treated.

2. The method according to claim 1 wherein the gas is selected from the class consisting of carbon dioxide, nitrogen, propane, ethane, methane, helium, argon, krypton, and xenon.

3. The method according to claim 2 wherein said principal liquid is an oil and the conditioning liquid immiscible therewith is an aqueous liquid.

4. The method according to claim 3 wherein the surface active agent employed is dimethyl-dicocoammonium chloride.

5. The method according to claim 2 wherein the principal liquid is an aqueous liquid and the conditioning liquid immiscible therewith is an oil.

6. The method according to claim 5 wherein the surface active agent employed is selected from the class consisting of the adduct prepared by reacting about 10 moles of ethylene oxide per mole of di-secondary-butyl-phenol and ethoxylated diamines.

7. The method according to claim 5 wherein said gas is formed in said liquid portion by introducing a low boiling liquid which becomes a substantially inert gas in the presence of said liquid, said low boiling liquid being introduced at a rate which results in a temperature at the point of introduction which does not appreciably congeal the oil nor freeze the aqueous liquid present in said treating composition.

8. The method according to claim 7 wherein the low-boiling liquid is liquid nitrogen.

9. The method according to claim 7 wherein the low-boiling liquid is liquid carbon dioxide.

10. The method according to claim 2 wherein said gas is introduced into a liquid portion of said composition just prior to its injection down the well.

11. The method according to claim 2 wherein sufficient of said gas is employed to provide a liquid phase to gas phase volume ratio, at the temperature and pressure conditioners existing at the level of the formation being treated, of at least about 10:1.

12. The method of drilling a well penetrating a formation employing a circulating drilling fluid composition comprising a principal liquid selected from the class consisting of oil-base and aqueous-base liquids which comprises admixing with said principal liquid (1) an amount of between about 0.01 and 10.0 percent, based on the volume of said principal liquid, of a conditioning liquid which is substantially immiscible with said principal liquid, (2) a surface active agent in an amount of between about 0.01 and about 20 percent, based on the volume of said principal liquid, and (3) sufficient substantially inert gas to form liquid and gaseous phases at the levels of the formation to which the said fluid is circulated, to make an improved fluid-loss drilling fluid and circulating the thus improved drilling fluid in the borehole being drilled.

13. The method according to claim 12 wherein the gas is introduced into a liquid portion of said drilling fluid as a low boiling liquid which becomes a substantially inert gas in the presence of said liquid, said low-boiling liquid being introduced at a rate which results in a temperature at the point of introduction which does not appreciably congeal the oil nor freeze the aqueous liquid present in said liquid.

14. The method of fracturing a formation penetrated by a well employing a fracturing fluid composition comprising a principal liquid selected from the class consisting of oil-base and aqueous-base liquids which comprises (A) admixing with said principal liquid (1) between about 0.01 and about 10.0 percent, based on the volume of said principal liquid, of a conditioning liquid substantially immiscible with said fracturing fluid, (2) a surface active agent, in an amount of between about 0.01 and about 20.0 percent, based on the volume of said principal liquid, and (3) sufficient amount of a substantially inert gas to form liquid and gaseous phases in said fracturing fluid composition at the levels of the formation being fractured to make an improved low fluid loss fracturing composition, and forcing the so improved into the formation at sufficient pressure to fracture the formation.

15. The method of acidizing a calcareous formation penetrated by a well employing an aqueous acidic composition which comprises (A) admixing with said acidic composition (1) an organic liquid substantially immiscible with said acidic composition in an amount of between .01 and 10 percent, based on the volume of said acidic composition, (2) a surface active agent in an amount of between 0.01 and 10 percent, based on the volume of said acidic composition, and (3) sufficient amount of a substantially inert gas to form a gaseous phase and a liquid phase at the conditions existing at the levels of the formation being acidized and forcing the resulting composition back into the formation at the levels where acidizing is to be effected.

References Cited
UNITED STATES PATENTS

| | | | |
|---|---|---|---|
| 2,726,063 | 12/1955 | Ragland et al. | 175—69 |
| 2,935,129 | 5/1960 | Allen et al. | 166—42.1 |
| 3,004,594 | 10/1961 | Crawford | 166—42.1 X |
| 3,136,361 | 6/1964 | Marx | 166—42.1 |
| 3,170,517 | 2/1965 | Graham et al. | 166—42.1 |

OTHER REFERENCES

Gatlin, Petroleum Engineering Drilling and Well Completions, 1st ed., Prentice-Hall, Inc., Engelwood Cliffs, N.J., 1960 (pages 82 and 83 relied on).

McCutcheon, "Surfactants Listed . . . ," fourth revision of synthetic detergents and emulsifiers, reprinted from Soap and Chemical Specialties, December 1957, January, February, March, April 1958, MacNair-Dorland Co., Inc., 1958. Pages 11 and 68 relied on.

CHARLES E. O'CONNELL, *Primary Examiner.*

STEPHEN J. NOVOSAD, *Examiner.*